United States Patent
Pettengill, Jr.

(10) Patent No.: US 11,677,224 B1
(45) Date of Patent: Jun. 13, 2023

(54) MARINE POWER BOX SYSTEM

(71) Applicant: Jeffrey C. Pettengill, Jr., New Port Richey, FL (US)

(72) Inventor: Jeffrey C. Pettengill, Jr., New Port Richey, FL (US)

(73) Assignee: The Infinity Affect LLC, Clearwater, FL (US)

( * ) Notice: Subject to any disclaimer, the term of this patent is extended or adjusted under 35 U.S.C. 154(b) by 42 days.

(21) Appl. No.: 17/506,138

(22) Filed: Oct. 20, 2021

Related U.S. Application Data

(60) Provisional application No. 63/093,919, filed on Oct. 20, 2020.

(51) Int. Cl.
| | |
|---|---|
| H02G 3/08 | (2006.01) |
| H02G 3/14 | (2006.01) |
| H01R 25/00 | (2006.01) |

(52) U.S. Cl.
CPC .............. *H02G 3/083* (2013.01); *H02G 3/14* (2013.01); *H01R 25/006* (2013.01)

(58) Field of Classification Search
CPC ........... H02G 3/14; H05K 5/03; H05K 9/0007
USPC .................. 439/106, 142, 271, 536; 174/18; 312/223.6, 223.2, 223.1, 236, 328, 194, 312/223.3, 237, 7.1, 116, 196, 228, 242, 312/107, 204, 208.1, 209, 223.4, 224, 312/235.2, 245, 249.8, 270.3, 280, 283, 312/284, 287, 297, 30, 319.5, 319.7, 323, 312/327, 348.3, 349, 401
See application file for complete search history.

(56) References Cited

U.S. PATENT DOCUMENTS

| | | | | | |
|---|---|---|---|---|---|
| 4,237,342 | A | * | 12/1980 | Eller ................... | H04M 1/0293 439/106 |
| 7,479,598 | B1 | * | 1/2009 | Shotey .................... | H02G 3/14 33/528 |
| 11,539,196 | B1 | * | 12/2022 | Baldwin ................ | H02G 3/083 |
| 2006/0130727 | A1 | * | 6/2006 | Eischeid ................. | E01F 9/617 114/219 |
| 2010/0178797 | A1 | * | 7/2010 | Byrne .................. | H01R 25/006 439/540.1 |
| 2011/0011321 | A1 | * | 1/2011 | Marshall ................... | E02B 3/20 114/230.22 |
| 2018/0034253 | A1 | * | 2/2018 | Mortun .................. | H02G 3/088 |

* cited by examiner

*Primary Examiner* — Krystal Robinson
(74) *Attorney, Agent, or Firm* — GrayRobinson, P.A.; Michael J. Colitz, III

(57) ABSTRACT

Disclose is a housing formed in a rectilinear configuration. The housing has rear and front cover panels, left and right side panels, and lower and upper panels. Next provided is a divider panel having a rectangular configuration disposed between the front cover panel and back panel, and between the left and right side panels, and between the lower and upper panels. Next provided is plurality of electrical receptacles located in the divider panel facing forwardly with wiring extending from a source of potential into the rearward chamber then coupling to the electrical receptacles. Lastly, a vent in the divider panel is provided with a fan for exhausting heated air from the rearward chamber to the forward chamber and to exterior of the housing.

9 Claims, 4 Drawing Sheets

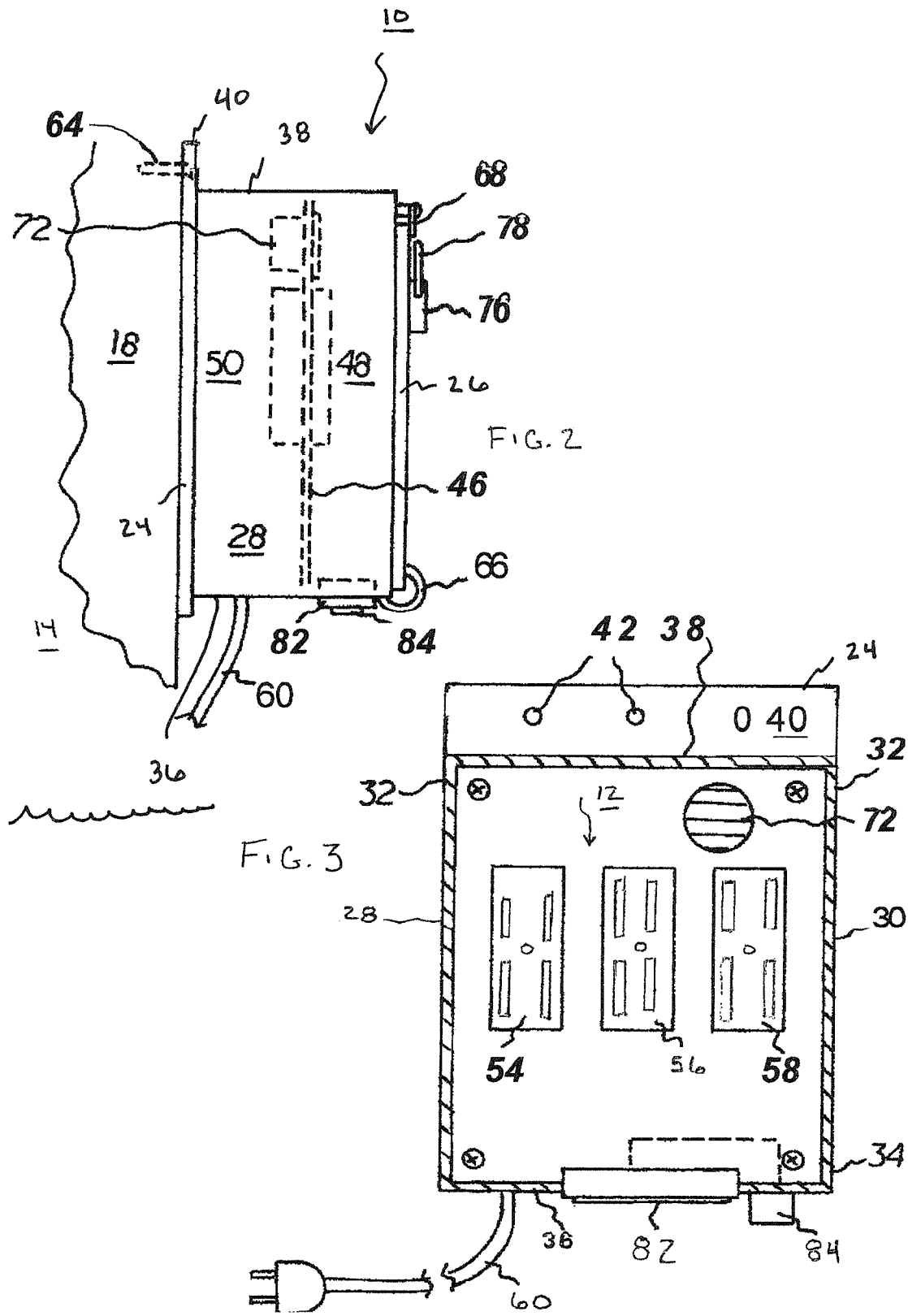

MARINE POWER BOX SYSTEM

CROSS REFERENCE TO RELATED APPLICATIONS

This application claims priority to Provisional Patent Application Ser. No. 63/093,919, filed on Oct. 20, 2020, entitled "Marine Power Box System," the contents of which is fully incorporated herein for all purposes.

TECHNICAL FIELD

The present invention relates to a marine power box system and more particularly pertains to providing electrical receptacles at a dock area while keeping the electrical receptacles dry.

BACKGROUND OF THE INVENTION

The use of electrical systems is known in the prior art. More specifically, electrical systems previously devised and utilized for the purpose of providing electrical receptacles at a dock area are known to consist basically of familiar, expected, and obvious structural configurations, notwithstanding the myriad of designs encompassed by the crowded prior art which has been developed for the fulfilment of countless objectives and requirements.

While known devices fulfill their respective, particular objectives and requirements, the prior art does not describe a marine power box system that provides electrical receptacles at a dock area and while keeping the electrical receptacles dry.

In this respect, the marine power box system according to the present invention substantially departs from the conventional concepts and designs of the prior art, and in doing so provides an apparatus primarily developed for the purpose of providing electrical receptacles at a dock area and for keeping the electrical receptacle dry.

Therefore, it can be appreciated that there exists a continuing need for a new and improved marine power box system which can be used for providing electrical receptacles at a dock area and for keeping the electrical receptacle dry. In this regard, the present invention substantially fulfills this need.

SUMMARY OF THE INVENTION

In view of the disadvantages inherent in the known types of electrical devices now present in the prior art, the present invention provides an improved marine power box system. As such, the general purpose of the present invention, which will be described subsequently in greater detail, is to provide a new and improved marine power box system which has all the advantages of the prior art and none of the disadvantages.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

For a more complete understanding of the present disclosure and its advantages, reference is now made to the following descriptions, taken in conjunction with the accompanying drawings, in which:

FIG. 2 is a side elevational view of the system shown in FIG. 1.

FIG. 3 is a cross sectional view of the power box.

Similar reference numerals refer to similar parts throughout the several views of the drawings.

DETAILED DESCRIPTION OF THE DRAWINGS

Figure 1:
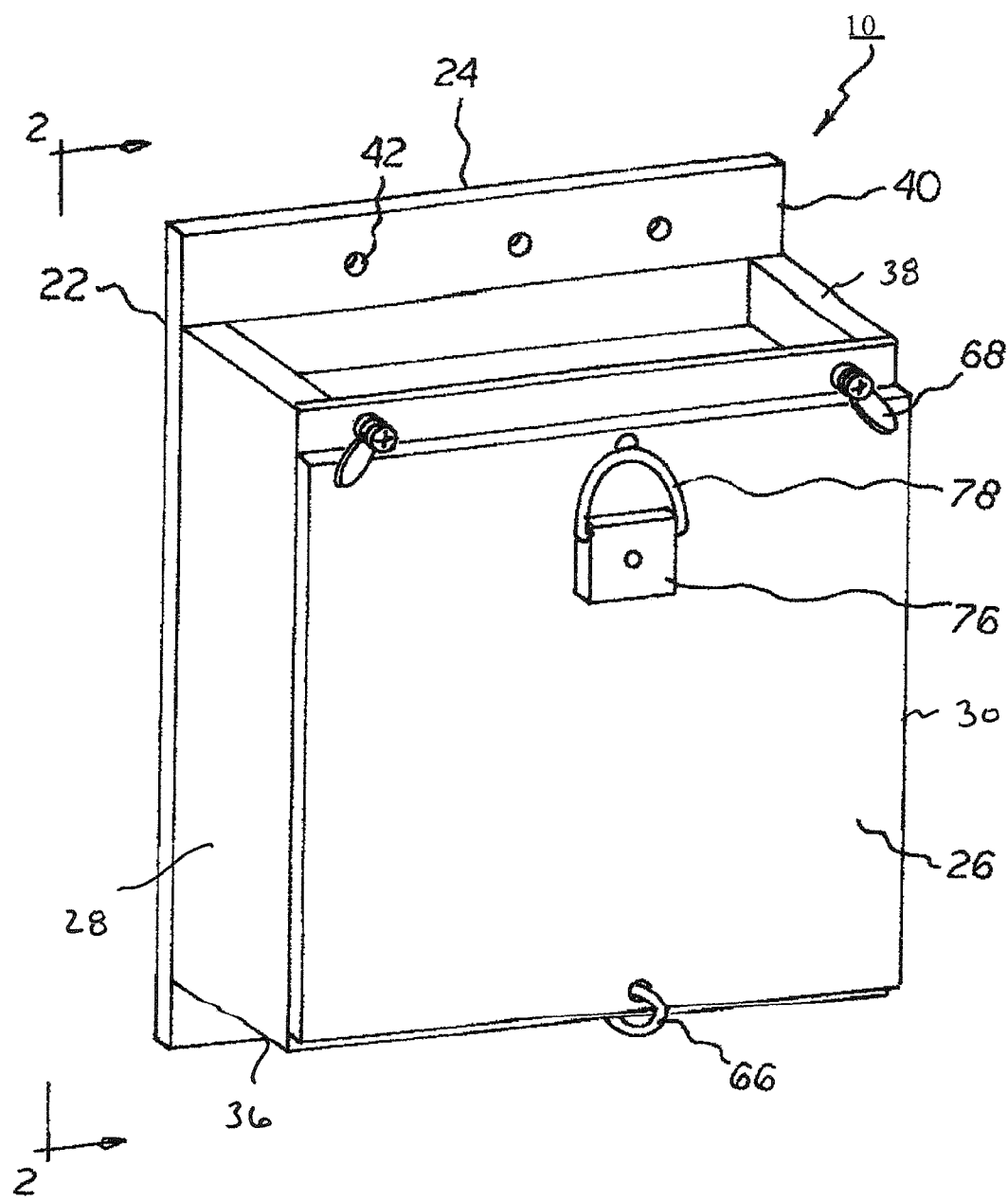
FIG. 1 is a perspective view of a marine power box system constructed in accordance with the present invention.
Figure 4:
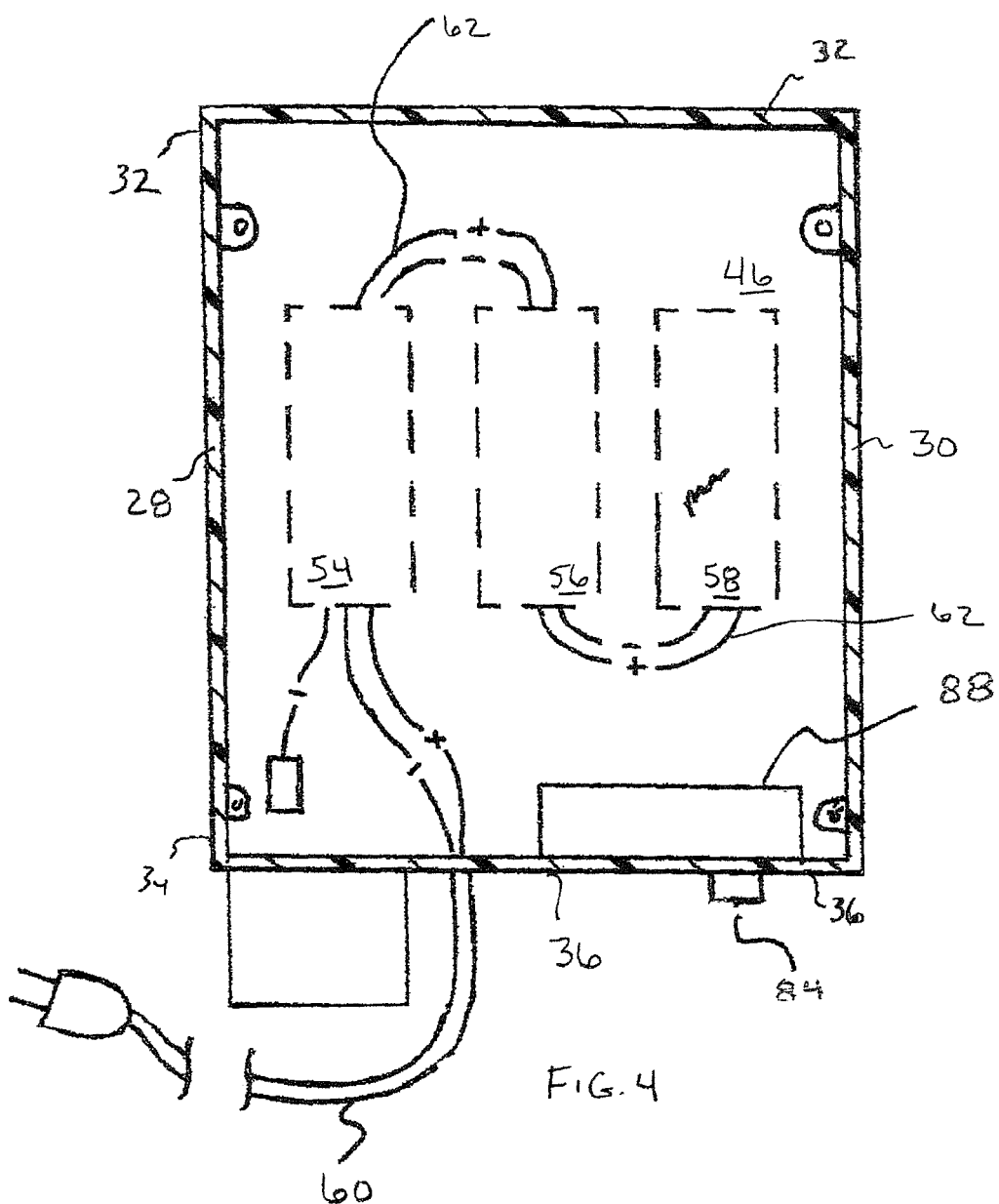
FIG. 4 is a cross sectional view of the power box.
Figure 5:
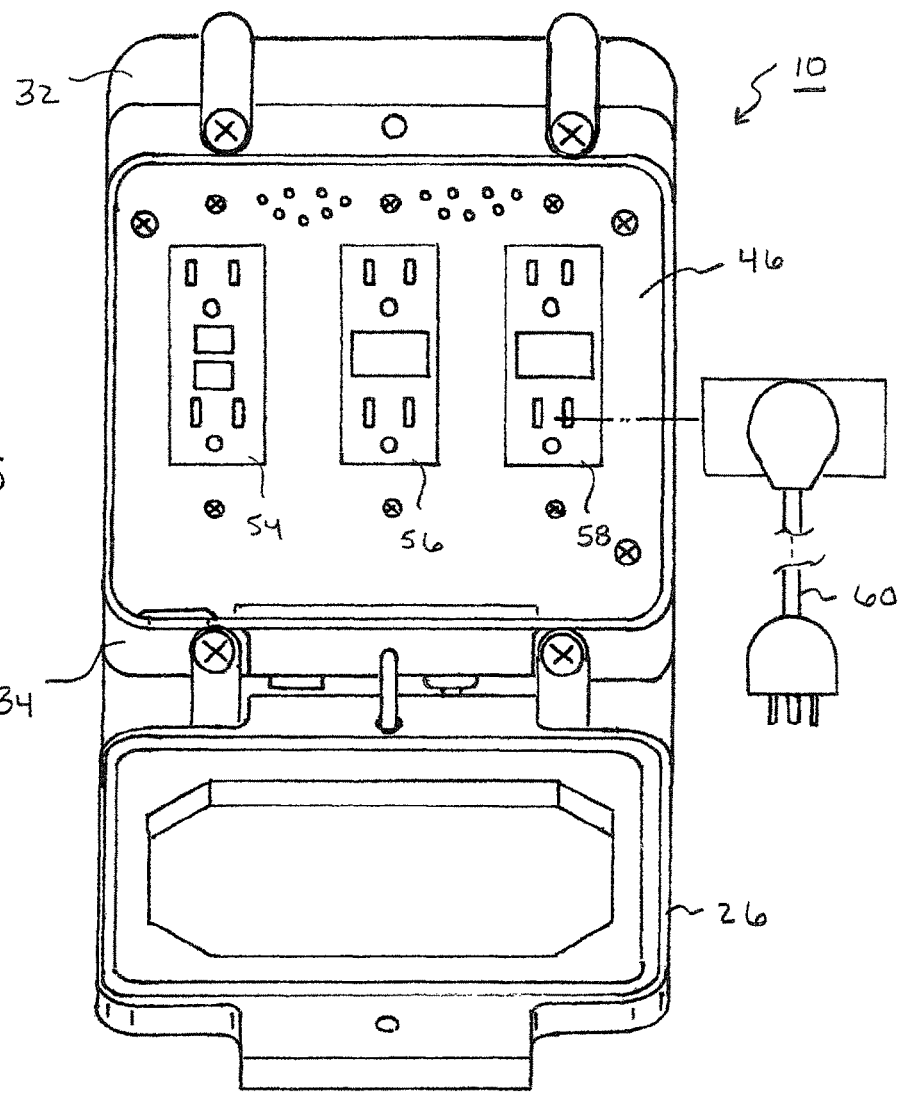
FIG. 5 is an additional perspective view of of the marine power box system of the present disclosure.
Figure 6:
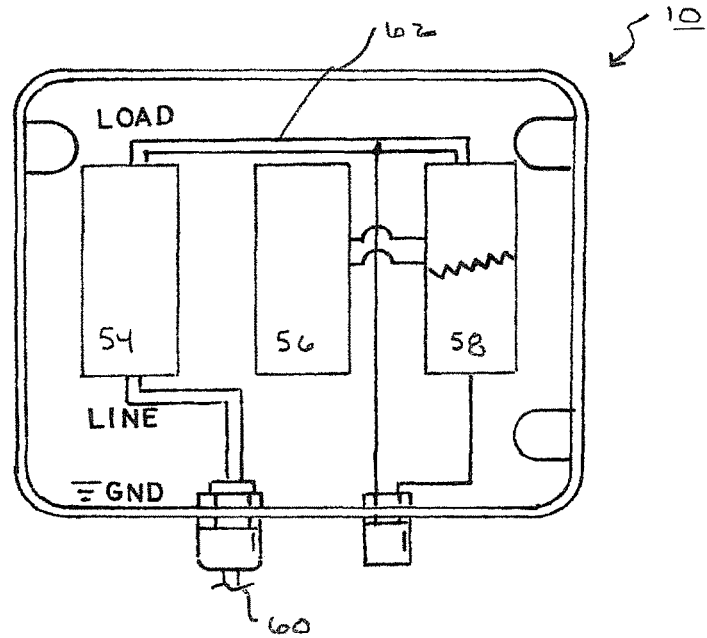
FIG. 6 is a plan view of a circuit board employed within the marine power box system.

With reference now to the drawings, the preferred embodiment of the new and improved marine power box system embodying the principles and concepts of the present invention and generally designated by the reference numeral 10 will be described.

The present invention, the marine power box system 10 is comprised of a plurality of components. Such components are individually configured and correlated with respect to each other so as to attain the desired objective.

From a broad view point, the present invention includes a housing formed in a rectilinear configuration. The housing has rear and front cover panels, left and right side panels, and lower and upper panels. Next provided is a divider panel having a rectangular configuration disposed between the front cover panel and back panel, and between the left and right side panels, and between the lower and upper panels. Next provided is plurality of electrical receptacles located in the divider panel facing forwardly with wiring extending from a source of potential into the rearward chamber then coupling to the electrical receptacles. Lastly, a vent in the divider panel is provided with a fan for exhausting heated air from the rearward chamber to the forward chamber and to exterior of the housing.

From a specific view point, the present invention is a marine power box system 10 for providing electrical receptacles 12 at a dock area 14 and for keeping the electrical receptacle dry. The providing the electrical receptacles and the keeping the electrical receptacles dry are done in a safe, convenient, and economical manner. The system includes a piling 18 in the dock area. The piling extends above water. The piling is fabricated of wood.

Next provided is a housing 22 formed in a rectilinear configuration. The housing has a rear panel 24 and a parallel front cover panel 26 separated by a depth. The housing has a left side panel 28 and a parallel right side panel 30 separated by a width. The front cover panel and the side panels are vertically disposed with upper ends 32 and lower ends 34. The housing has a horizontal lower panel 36 coupled to the lower ends. The housing has a horizontal upper panel 38 coupled to the upper ends. The back panel has an elevated section 40 extending above the top panel with apertures 42 for coupling the housing to the piling.

Next provided is a divider panel 46 having a rectangular configuration vertically disposed between the front cover panel and the back panel and parallel therewith. The divider panel 46 is disposed between the left side panel and the right side panel and perpendicular thereto. The divider panel 46 is disposed between the lower panel and the upper panel and perpendicular thereto. The divider panel creates a forward chamber 48 extending forwardly from the divider panel to the cover panel. The divider panel creates a rearward chamber 50 extending rearwardly from the divider panel to the rear panel.

A plurality of electrical receptacles 12 are located in the divider facing forwardly with wiring extending from a source of potential into the rearward chamber then coupling to the electrical receptacles. One receptacle 54 is activated at all times. Two receptacles 56, 58 are activated as controlled by a user. Electrical receptacles (54, 56, 58) are connected to a source of power via power cable 60 and are interconnected via wiring 62.

A securement assembly is provided which includes a threaded fastener 64 extending through an aperture into the piling. A hanging ring 66 extends centrally through the cover panel and the bottom panel pivotally coupling the cover panel 26 to the bottom panel 36.

Laterally spaced fasteners 68 are secured to the top panel adjacent to the cover panel. The fasteners are rotatable to a raised position allowing lowering the cover panel to provide access to the receptacle. The fasteners are rotatable to a lowered position allowing raised securement of the cover panel to keep the receptacles dry and to prevent unauthorized access to the receptacle.

A vent 72 is located in the divider panel with a fan for exhausting heated air from the rearward chamber to the interior panel and then exterior of the housing.

A lock 76 is provided on the cover panel adjacent to the top panel centrally between the fasteners. A handle 78 coupled to the lock assists in raising and lowering the cover panel.

A source of illumination 82 provides light in the dark. A light sensor to determines when it is light to turn off the source of illumination. The illumination source 82 is controlled via photocell 84.

Lastly, a control panel 88 is operatively coupled to the housing for controlling the operation of the system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A ventilated power box system (10) adapted for marine use, the power box system (10) comprising in combination:
   a housing (22) including front and rear cover panels (26, 24), horizontally arranged upper and lower panels (38, 36), and opposing side panels (28, 30), a lower edge of the front cover panel (26) being pivotally connected to the lower panel (36) via a ring (66), the front cover panel (26) having opened and closed orientations relative to the housing (22), fasteners (68) for selectively locking the front cover panel (26) to the upper panel (38), the rear cover panel (24) including a section (40) that extends above the upper panel (38), section (40) including mounting apertures (42);
   a divider panel (46) positioned within the housing (22) between the front and rear cover panels (26, 24), the divider panel (46) creating separate forward and rearward chambers (48, 50) within the housing (22), a series of electrical outlets (12) positioned within the divider panel (46), the electrical outlets (12) being accessible with front cover panel (26) in the opened orientation, electrical wiring (60) extending from an external power source through the lower panel (36) and to the outlets (12) via the rearward chamber (50), a vent (72) positioned within the divider panel (46) for expelling gases from the rearward chamber (50) and toward the forward chamber (48);
   a piling (18) positioned within and extending above a body of water, the housing (22) being mounted to the piling (18) at a location above the water via the mounting apertures (42) within section (40).

2. A ventilated power box system (10) adapted for marine use, the power box system (10) comprising in combination:
   a housing (22) including front and rear cover panels (26, 24), horizontally arranged upper and lower panels (38, 36), and opposing side panels (28, 30), a lower edge of the front cover panel (26) being pivotally connected to the lower panel (36), the front cover panel (26) having opened and closed orientations relative to the housing (22);
   a divider panel (46) positioned within the housing (22) between the front and rear cover panels (26, 24), the divider panel (46) creating separate forward and rearward chambers (48, 50) within the housing (22), at least one electrical outlet (12) positioned within the divider panel (46), the electrical outlet (12) being accessible with front cover panel (26) in the opened orientation, a vent (72) positioned within the divider panel (46) for expelling gases from the rearward chamber (50) and toward the forward chamber (48).

3. The ventilated power box system (10) as described in claim 2 further comprising a piling (18) positioned within and extending above a body of water, the housing (22) being mounted to the piling (18).

4. The ventilated power box system (10) as described in claim 2 further comprising a section (40) of the rear cover panel (24) that extends above the upper panel (38).

5. The ventilated power box system (10) as described in claim 4 further comprising mounting apertures (42) positioned within section (40).

6. The ventilated power box system (10) as described in claim 5 wherein the housing (22) is mounted upon a piling (18) via the mounting apertures (42) within section (40).

7. The ventilated power box system (10) as described in claim 2 further comprising a ring (66) pivotally connecting the front cover panel (26) to the housing (22).

8. The ventilated power box system (10) as described in claim 2 further comprising fasteners (68) for selectively locking the front cover panel (26) to the upper panel (38).

9. The ventilated power box system (10) as described in claim 2 further comprising electrical wiring (60) extending from an external power source through the lower panel (36) and to the outlet (12) via the rearward chamber (50).

* * * * *